United States Patent Office 3,414,302
Patented Dec. 3, 1968

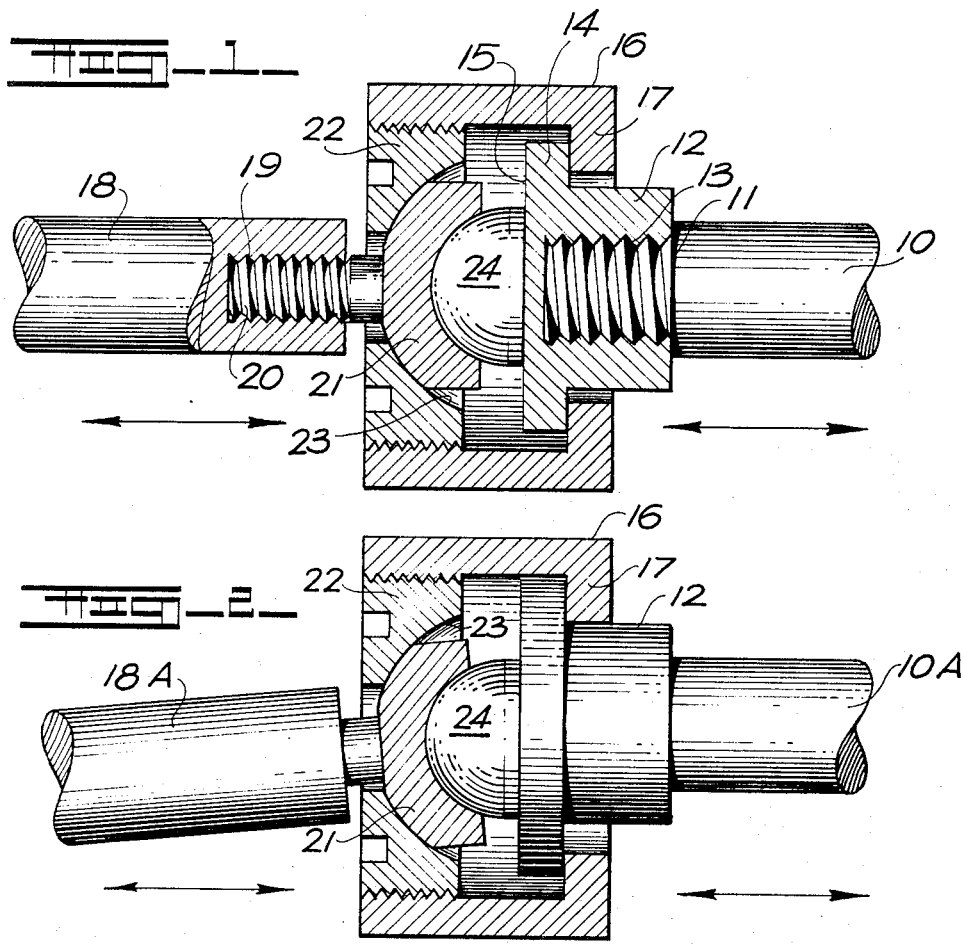

3,414,302
COUPLING FOR MISALIGNED RECIPROCAL SHAFTS
Herbert A. Priest, Alpena, Mich., assignor to Universal Fluid Dynamics Company, Alpena, Mich., a corporation of Michigan
Filed Dec. 23, 1966, Ser. No. 604,397
1 Claim. (Cl. 287—87)

ABSTRACT OF THE DISCLOSURE

The coupling disclosed is for misaligned shafts where a wide range of adjustment is necessary and includes a clamping ring having an inturned annular flange at one end defining an opening which receives the flanged fitting of one shaft and permits substantial lateral movement thereof. The spacing element which slides on the inner face of the flanged fitting, and which operates in the socket of the body member carried by the other shaft is of sufficient size and of sufficient axial dimension to permit the body member of the second shaft to turn a substantial distance out of alignment.

---

This invention relates to a coupling for securing two shafts together despite the misalignment of said shafts, and usable in an environment where the shafts reciprocate and do not rotate, for example, in connecting the piston rod of a hydraulic piston and cylinder assembly, to a work piece to be moved thereby. The coupling for misaligned reciprocating shafts provides for offset misalignment as between the end portions of the shafts to be coupled, and also provides for angular misalignment relative to the axial center lines of the shafts to be coupled. The coupling for misaligned reciprocal shafts enables hydraulic piston and cylinder assemblies or air cylinders to be quickly and easily coupled to work pieces without the necessity of repositioning the piston and cylinder assemblies to obtain end-to-end and axial alignment of the respective shafts, as has heretofore been necessary.

The principal object of the invention is the provision of a simple and inexpensive coupling for misaligned reciprocal shafts that may be quickly and easily installed, and which will then serve to suitably connect said shafts for reciprocal movement, despite any misalignment that may exist between them. A further object of the invention is a provision of a coupling for misaligned reciprocal shafts that may be produced at relatively low cost, and which is adaptable and quickly installed on reciprocal shafts which must be connected to one another so as to form a continuous fixed connection between said shafts.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a cross-sectional view of the coupling for misaligned reciprocal shafts showing the same installed between opposed end portions of a pair of shafts.

FIGURE 2 is a cross-sectional elevation of the coupling for misaligned reciprocal shafts showing the same installed between a pair of shafts, one of which is axially disposed at an angle to the axis of the other of said shafts.

By referring to the drawings, and FIGURE 1 in particular, it will be seen that a piston rod 10, as for example that forming a part of a hydraulic piston and cylinder assembly or an air cylinder assembly, and used as a power and motion source, has been provided with a threaded end portion 11 and that the same is shown engaged in a flanged fitting 12 having a conforming thread pattern 13 therein. The flanged fitting 12 has an annular flange 14 and a flat unbroken end portion 15. A clamping ring 16 having a secondary annular flange 17, is positioned over the flanged fitting 12 so that the secondary annular flange 17 abuts the annular flange 14 thereof on the side thereof opposite the flat end portion 15. It will be seen that the secondary annular flange 17 defines a circular opening relatively larger than the diameter of the flanged fitting 12 so that the same may move relative thereto, and thus compensate for lack of alignment between the piston rod 10 and a shaft to be coupled thereto. In FIGURE 1 of the drawings the shaft to be coupled to the piston rod 10 is indicated by the numeral 18, and may comprise a portion of a work piece to be moved by the piston rod 10, as will be understood by those skilled in the art.

As illustrated, the shaft 18 has an internally threaded opening 19 in an end thereof, and it threadably receives and holds a stud 20, which has a conforming thread pattern. The stud 20 has an integral body 21 curved on the radius of a sphere and positioned within the clamping ring 16 by a secondary clamping ring 22. The clamping ring 22 is formed with an inner curved surface 23 conforming with the outer curved surface of the body 21. A spacing member 24, having one flat side and one curved side, is positioned between the flat end portion 15 of the flanged fitting 12 and the body 21 so as to register therewith, and is movable relative to both.

As illustrated in FIGURE 1 of the drawing, the piston rod 10 and the shaft 18 are in substantial end-to-end and axial alignment and the coupling is tightened up by rotating the secondary clamping ring 22 with a wrench engaging openings therein, as will be understood by those skilled in the art, until the respective parts are brought into intimate engagement with one another.

By referring now to FIGURE 2 of the drawings, the same coupling may be seen securing a piston rod 10-A which is disposed on a horizontal axis to a shaft 18-A which is angularly disposed and offset endwise relative to the piston rod 10A. It will be seen that the flanged fitting 12 has moved vertically within the clamping ring 16 and the integral body 21 has moved relative to the curved surface 23 of the secondary clamping ring 22 and the spacing member 24. It will thus be seen that the coupling for misaligned reciprocal shafts provides for the quick and easy coupling of such misaligned shafts to one another, and that it is therefore unnecessary to reposition and adjust the devices to which the shafts or piston rods are connected, as has heretofore been the case. Those skilled in the art will understand that the coupling disclosed herein will permit rapid and effective coupling of shafts which are horizontally disposed and offset in endwise relation to one another, and that it will also permit rapid and effective coupling of shafts where one is on a horizontal axis and the other is at an angle thereto, and whether or not the ends of the misaligned shafts are offset endwise or on a common horizontal plane.

It will thus be seen that the coupling for misaligned reciprocal shafts disclosed herein meets the several objects of the invention, and having thus described my invention, what I claim is:

1. A coupling for misaligned shafts including a flanged fitting adapted to be attached to one of said shafts and a cross-sectionally concavo-convex body member having a shank adapted to be attached to the other of said shafts, a clamping ring engaged with said flanged fitting and movable relative thereof, said ring comprising a cylindrical housing portion of a given inner diameter with an inturned flange at one end, said flanged fitting having a shank at one end, and a flange at the other end with an outer diameter considerably less than said given diameter of said housing with one side of said flange providing a planar inner surface and the other side of said flange providing a planar outer surface, said inturned flange defining an opening receiving said shank, which opening is substantially larger in diameter than said shank, said inturned flange also having a planar inner surface slidably contacting the planar outer surface of said fitting flange, a spacer having an outer segmental spherical surface received in the concave surface of said body member and a cylindrical extension thereon terminating in a flat planar inner surface slidably contacting said planar inner surface of said flanged fitting and of substantially less diameter than the planar inner surface of said fitting, a secondary clamping ring engaged in the other end of said housing portion and in complementary abutting relation with the convex surface of said body member and having an opening receiving the shank of said body member and the diameter of the last named opening being substantially greater than the diameter of said last named shank whereby said planar concave and convex surfaces have relative free sliding movement.

References Cited

UNITED STATES PATENTS

| | | | |
|---|---|---|---|
| 1,888,158 | 11/1932 | Browne | 64—7 XR |
| 2,392,039 | 11/1946 | Gideon | 279—16 |
| 2,451,683 | 10/1948 | Mantle | 279—16 XR |
| 2,841,968 | 7/1958 | Helmke | 64—7 XR |

FOREIGN PATENTS 901,628   11/1944   France.

CARL W. TOMLIN, *Primary Examiner.*

ANDREW KUNDRAT, *Assistant Examiner.*